Patented Dec. 2, 1924.

1,517,660

UNITED STATES PATENT OFFICE.

HENRY H. WILLIAMS, OF ABILENE, TEXAS, ASSIGNOR OF ONE-THIRD TO HERBERT B. MUNDT AND ONE-THIRD TO CHARLES H. SIEG, BOTH OF CHICAGO, ILLINOIS.

ELECTROLYTE.

No Drawing. Application filed June 20, 1923. Serial No. 646,654.

*To all whom it may concern:*

Be it known that I, HENRY H. WILLIAMS, a citizen of the United States, residing at Abilene, in the county of Taylor and State of Texas, have invented a certain new and useful Improvement in Electrolytes, of which the following is a specification.

This invention is an electrolyte to replace sulphuric acid in storage batteries at much less expense; which preserves the plates and protects them from sulphation and corrosion; which gives longer life to the battery and on being inserted in the battery produces a fully charged battery without its being placed in charging circuit.

In carrying out this invention, the materials are assembled in the following proportions:

Sixty-three quarts of distilled water,
Twenty-seven quarts of 1835 acid (sulphuric),
Two ounces of zinc oxide, diluted in three quarts of water,
Twelve ounces of powdered alum, diluted in five quarts of water,
One-quarter of a pint of glycerine,
Twenty ounces of potash dissolved in two quarts of water, and
One ounce of sulphate of iron.

These ingredients are thoroughly mixed and allowed to stand for twenty-four hours. The quantity named will make twenty-five gallons.

After the solution has been mixed as above, it is placed in any ordinary lead plate storage battery with the desired results.

Having thus described my invention, what I desire to secure by Letters Patent is:

1. An electrolyte solution for electric batteries containing the following materials in the proportions named: 63 quarts of distilled water; 67 quarts of sulphuric acid; 2 ounces of zinc oxide, preferably first diluted in three quarts of water; 12 ounces of powdered alum, preferably first diluted in five quarts of water; ¼ of a pint of glycerine; 12 ounces of potash, dissolved in two quarts of water; 1 ounce of sulphate of iron.

2. An electrolyte solution made up of the following materials in approximately the proportions named: 27 quarts of sulphuric acid; 2 ounces of zinc oxide; 12 ounces of powdered alum; ¼ pint of glycerine; 20 ounces of potash; 1 ounce of sulphate of iron; and 73 quarts of water.

In witness whereof, I have hereunto subscribed my name.

HENRY H. WILLIAMS.